Patented Sept. 12, 1944

2,358,187

UNITED STATES PATENT OFFICE 2,358,187

PROCESS OF REGENERATING SODIUM HYDROXIDE-SODIUM SULPHIDE COOKING LIQUORS

Walter Lee Savell, Forest Hills, N. Y., assignor to The Mathieson Alkali Works, Inc., New York, N. Y., a corporation of Virginia No Drawing. Application January 13, 1942, Serial No. 426,639

4 Claims. (Cl. 23—48)

This invention relates to improvements in the regeneration of sodium hydroxide-sodium sulphide cooking liquors for the production of wood pulp by the Kraft or so-called sulphate process.

Following the cooking operation of the sulphate process, in which wood is pulped by the cooking liquor, the spent liquor is drained and washed from the pulp mass and processed for recovery of sodium hydroxide and sodium sulphide. As separated from the pulp, the spent liquor is known as "black liquor." This black liquor contains any unconsumed sodium hydroxide and sodium sulphide, compounds formed by reaction of these pulping agents with organic constituents of the wood and other organic material extracted from the wood during cooking.

In the conventional recovery operation, this black liquor is dehydrated to form a dehydrated residue known as "black ash" containing a substantial proportion of organic material, this dehydrated residue is carbonized and burned to eliminate the organic matter and to regenerate the inorganic salts potentially present, and the inorganic residue is fused to produce a molten salt mixture consisting chiefly of sodium carbonate and sodium sulphide. This salt mixture is then dissolved in water to form a solution known as "green liquor." This green liquor is causticized with lime, to convert sodium carbonate to sodium hydroxide, and the resulting solution, known as "white liquor," becomes available as fresh cooking liquor in the pulping operation.

The steps of dehydration, carbonization, burning and fusion are carried out in a furnace which may take a variety of forms (see for example power, vol. 83, No. 5, pages 80–81, May, 1939). The heat of combustion of the organic matter eliminated is usually sufficient to maintain the operation and to supply heat to produce steam.

Losses in handling and in the several processing steps require the addition of makeup material to maintain the required concentrations of sodium hydroxide and sodium sulphide in the cooking liquor. The losses include leakage, losses involved in separation of spent liquor from pulp and in pulp washing, entrainment in blowoff from the cooking operation, decomposition of sulphides by hydrolysis and resulting losses of sulphur in the form of gaseous compounds such as hydrogen sulphide, fume losses and other physical losses in the recovery operation.

In conventional practice, these losses are made up by the addition of sodium sulphate at a point in the recovery operation such that it is reduced to sodium sulphide in connection with carbonization and combustion of the dehydrated residue or black ash. It is this characteristic of the general operation which has caused it to be designated as the "sulphate process" although sodium sulphate as such plays no part in the cooking operation itself. It has also been proposed to effect the necessary makeup by addition of sodium carbonate and sulphur to the black liquor. The addition of sodium carbonate or sulphur to the smelting furnace wherein the black ash is being carbonized or burned has also been suggested. The improvements of this invention afford important advantages with respect to these practices previously available.

In my co-pending application Serial No. 325,653, filed March 23, 1940, of which the present application is in part a continuation, there are described improvements in the regeneration of sodium hydroxide-sulphide cooking liquors comprising the addition of a mixture of soda ash and sulphur, preferably as a mixture of soda ash and sulphur intimately aggregated by fusion, to the residue produced by dehydration of the black liquor after this dehydration, i. e. the removal of water present as a physical component, is substantially complete, after carbonization, i. e. the heating of the black ash to decompose or volatilize or drive off organic matter contained therein, has been begun and before burning is complete, in the otherwise conventional recovery operation.

In accordance with the invention therein described, the addition of the soda ash and sulphur mixture is made before burning of the carbon residue is completed as some small amount of carbon is required to effect the reduction involved. The addition may be made during the burning or it may be made at any point after carbonization of the black ash is begun and with advantage is made at a point approximating completion of carbonization. By so operating, the added sulphur is substantially completely converted to the sulphide and the usual loss of sulphur in the furnace gases is reduced to a minimum.

The advantages derived from this improved operation are not attained if sodium carbonate and sulphur are added to the black liquor. When sulphur is added to the black liquor, hydrogen sulphide is formed and liberated in subsequent processing at temperatures below those at which the sulphur can react with the soda compounds present. Moreover, the addition of soda ash to the black liquor results in direct reaction between the soda ash and organic components of the black liquor to form compounds the soda content of which is not available for reaction with the sulphur until the organic components of such compounds have been eliminated by carbonization. By the time the soda content of such compounds thus becomes available for reaction with sulphur, much of the sulphur has been either otherwise reacted or eliminated in the form of gaseous compounds such as hydrogen sulphide and sulphur dioxide. These difficulties make it impossible to attain the ends of this invention in any practical sense by any addition of soda ash and sulphur to the black liquor.

In the practice of my said invention such difficulties and losses are avoided by adding the soda ash and sulphur as described only after dehydration of the black liquor is substantially complete but before burning is completed. The operation is improved by the elimination of hydrogen evolved in the carbonization process prior to the addition of soda ash and sulphur.

The present invention is based on my discovery that improved results are obtained if the soda ash is caused to react with the sulphur in a non-oxidizing atmosphere prior to any substantial mixing of either with the carbonized or partly carbonized residue from the black liquor. Such reaction may be brought about by subjecting the mixture of soda ash and sulphur to a preliminary heating to the reaction temperature. Thereafter the reacted product in a molten condition is with advantage caused to flow over the hot burning carbonaceous residue from the black ash.

In accordance with the present invention, the soda ash and sulphur are subjected to the preliminary heating in intimate admixture, preferably intimately aggregated by fusion as described, in Patent Number 2,223,631, issued December 3, 1940 on application of Robert B. MacMullin. For convenience, this intimate admixture of soda ash and sulfur, whether or not aggregated by fusion, will hereinafter be designated "synthetic salt cake."

Upon heating to a temperature around 300° C. in a non-oxidizing atmosphere, particularly if in intimately aggregated mixture, the sodium carbonate and sulphur react readily to form sodium sulphide and sodium sulphite. During the subsequent burning or carbonization and burning of the black ash residue with the reaction product admixed therewith, the sodium sulphite is reduced to sodium sulphide. The general reactions involved may be typified as follows:

(1) $2Na_2CO_3 + 3S = 2Na_2S + 2CO_2 + SO_2$
(2) $Na_2CO_3 + SO_2 = Na_2SO_3 + CO_2$
(3) $Na_2SO_3 + 3C = Na_2S + 3CO$

The preliminary heating and resultant reaction of the soda ash and sulphur constituents of the synthetic salt cake is with advantage accomplished in accordance with the present invention by charging the synthetic salt cake into the furnace or smelter in which the black ash residue is being burned in such a way that it is brought into heat exchange relationship with the burning residue without becoming admixed therewith to any material extent until it has been heated to the reaction temperature of its constituents and preferably until the reaction between the soda ash and the sulphur is substantially completed. For example, the synthetic salt cake may be charged onto the top of a burning mass of black ash residue so that there is no substantial mixing of the synthetic salt cake with the burning mass until the soda ash and sulphur have become sufficiently heated to cause their reaction. The reacted mass in a molten condition is then permitted to flow down over the burning mass and the sulphite thereby reduced to sulphide. In this manner the operation may be carried out in the conventional apparatus already available with a minimum of handling, labor and loss of materials. The preliminary heating of the synthetic salt cake to the reaction temperature is accomplished by heat from the burning residue and consequently there is no added fuel requirement. Further, the reducing atmosphere of the furnace is a particularly suitable environment for the desired reaction between the soda ash and sulphur.

By heating the soda ash and sulphur in intimate admixture in the reducing atmosphere of the furnace so as to cause the desired reaction between the soda ash and the sulphur before admixture to any substantial extent with any of the materials normally introduced into the furnace, and particularly organic matter, there is avoided the loss of sulphur, which occurs when free sulphur, whether or not it is admixed with sodium carbonate, is heated with organic material present in black liquor or black ash. Smelting furnaces of conventional types have been found to be very satisfactory units for providing the heat and the reducing atmosphere necessary for inducing the desired reaction between the sodium carbonate and the sulphur.

The present invention is not limited in its use to any particular type of recovery furnace. It is adapted to any of the conventional types of smelters, which permit the preliminary heating of the synthetic salt cake by heat from the burning residue in a reducing atmosphere to temperatures at which the sodium carbonate will react with the sulphur, and preferably so that the reaction may be substantially completed, prior to any material amount of mixing of the soda ash or sulphur with the black ash residue, and so that, after this preliminary heating, the reaction products come into contact with the partially carbonized residue of the black ash to complete the reduction of the sodium sulphite and any other oxidized combination of alkali and sulphur. This is readily accomplished in any type of recovery furnace in which the synthetic salt cake can be charged onto a hot bed of burning black ash residue formed by the dehydration and carbonization or partial carbonization of the black liquor.

In using a conventional recovery furnace of the Tomlinson type, the synthetic salt cake may be shoveled through the access door at the back of the furnace, forming a pile of the synthetic salt cake on the bed of hot charred black liquor residue therein. Similarly, in using a recovery furnace of the Murray-Waern type, the synthetic salt cake may be periodically dumped or shoveled directly into the combustion unit which receives the dehydrated and charred product discharged from the heated rotary unit.

The soda ash and sulphur are added in the proportions necessary to maintain the required concentration of sodium hydroxide and sodium sulphide in the cooking liquor. These proportions will vary as the losses of soda and sulphur vary in the particular operation. If the sodium carbonate and sulphur are added in ratio (by weight) of 106:32, the addition of 138 pounds of this mixture will be equivalent to the addition of 142 pounds of sodium sulphate. Thus, in any particular operation, the ratio of mixed sodium carbonate and sulphur (mixed in a ratio of 106:32) to the sodium sulphate for which the mixture is to be substituted will be about 138:142 or somewhat less because of the improvements in efficiency attained through the invention. Where the losses of soda and sulphur vary from the ratio in which these two components are replaced by addition of sodium sulphate, the ratio of sodium carbonate to sulphur in the mixture added for makeup is correspondingly varied to balance the differences in such losses.

My invention will be further illustrated by the following description of its commercial application to conventional recovery units.

One commercial unit to which my present invention has been successfully applied consists essentially of a rotary furnace from which the partly carbonized black ash is discharged alternately to one of two rectangular burning and smelting furnaces. In the top portion of each of the smelting furnaces there is a door on a level with the floor of the building housing the unit. This unit is so operated that partly carbonized black ash from the rotary furnace is charged to alternate smelting furnaces for periods of one-half hour. Shortly after this feed is switched from the first smelting furnace to the second, the required amount of synthetic salt cake, usually about 250 pounds, is dumped through the said door at the top of the smelter and permitted to fall in a heap onto the top of the smelt bed, in which position it becomes heated and finally fused by absorbed heat and the reaction between the constituents thereof effected substantially completely with no contact whatever with the black liquor and only relatively slight contact with the black ash residue prior to their reaction. Finally, the reaction products melt and run down over the burning residue and the sodium sulphite is thereby reduced to the sulphide. The synthetic salt cake is thus charged to each of the smelting furnaces hourly by alternately charging the salt cake to one and then the other every half hour.

A second conventional type recovery unit to which my invention has been successfully applied consists of a rotary black ash furnace which discharges continuously into a single cylindrical smelting furnace. This melting furnace has two oppositely-positioned firing doors just above the normal level of the bed of burning black ash maintained therein. These doors are for use in raking and trimming fires and for firing wood and other materials when necessary. In accordance with my invention, a quantity of synthetic salt cake, usually about 250–300 pounds, is rapidly shoveled once each hour through each door of the smelter, i. e. through alternate doors every half hour, so as to form a mass of the synthetic salt cake on a portion of the bed of burning residue least disturbed by the charge from the rotary black ash furnace. In this operation the synthetic salt cake becomes heated by absorbing heat from the burning bed of black ash and the reaction of the constituents thereof is substantially completed without any material mixing of the unreacted sodium carbonate or sulphur with the black ash residue. Thereafter, the molten reaction products run down over the burning residue and the sodium sulphite is reduced to the sulphide.

In a third commercial operation utilizing my invention, a conventional B. & W. Tomlinson recovery unit is employed and in the operation of this unit the black liquor is continuously sprayed onto the internal walls of the furnace. When this black liquor has become evaporated to a sufficiently dry state to support combustion, the residue falls to the bottom of the unit, thus maintaining therein a bed of burning black ash. The nozzle through which the black liquor is sprayed is situated in the front portion of the furnace and the spray is directed toward the rear wall. In accordance with my invention, the synthetic salt cake is continuously blown into the front of the furnace through a stationary nozzle situated directly below the nozzle through which the black liquor is injected and directed at such an angle that the synthetic salt cake hits the bed of burning black ash just below the top of the bed. There the synthetic salt cake sticks, forms a crusty deposit and, in this position, fuses and smelts with a minimum of mixing with the black ash until the reaction between its soda ash and sulphur constituents is substantially completed, as, in this apparatus, the black liquor spray nozzle does not deposit black liquor residue on the surface of the front walls of the furnace to any great extent. This is also accomplished with a minimum of mixing with primary air since there are no air ports on the front side of the smelter. In this operation, a pressure of about 20 pounds per square inch was maintained in the smelting furnace.

It will be understood that in each of these commercial operations just described, the inorganic constituents originally potentially present in the black ash and the added reaction products of the synthetic salt cake are fused and drawn from the smelting furnace and treated in the conventional manner for the production of white liquor.

As previously described, the proportion of soda ash and sulphur added as described is adjusted to suit the particular operating conditions so as to maintain the required sulphidity and alkalinity.

I claim:

1. In the regeneration of sodium hydroxide-sodium sulphide cooking liquors by dehydrating the spent liquor to form black ash, carbonizing the black ash, burning the carbonized residue and fusing the resultant organic residue and in which a bed of burning carbonized residue is maintained in a recovery furnace, the improvement which comprises maintaining in a non-oxidizing atmosphere in said furnace an admixture of soda ash and sulphur in which the two constituents are in such contact that on heating to their reaction temperature substantially the entire amounts of the soda ash and sulphur will substantially completely react, said admixture being maintained in heat exchange relation with the burning residue but with no substantial mixing therewith until said admixture has become heated to the reaction temperature of its soda ash and sulphur constituents, and thereafter causing the resultant reaction products to be brought into contact with the burning carbonized residue.

2. In the regeneration of sodium hydroxide-sodium sulphide cooking liquors by dehydrating the spent liquor to form black ash, carbonizing the black ash, burning the carbonized residue and fusing the resultant organic residue and in which a bed of burning carbonized residue is maintained in a recovery furnace, the improvement which comprises charging on to a bed of burning residue an admixture of soda ash and sulphur in which the two constituents are in such contact that on heating to their reaction temperature substantially the entire amount of the soda ash and sulphur will substantially completely react, maintaining said admixture on the bed of burning residue without substantially mixing with the residue until said admixture has become heated to the reaction temperature of its soda ash and sulphur constituents to form a molten mixture consisting primarily of sodium sulphide and sodium sulphite, and thereafter permitting the molten reaction products to flow over the burning residue with resulting reduction of the sodium sulphite to sodium sulphide.

3. In the regeneration of sodium hydroxide-sodium sulphide cooking liquors in which a bed of burning carbonized residue from the spent liquor, consisting principally of carbon and inorganic material, is maintained in a recovery furnace wherein the residue is burned and fused, the improvement which comprises periodically charging carbonized residue to the furnace and alternately charging on to the bed of burning residue an admixture of soda ash and sulphur in which the two constituents are in such contact that on heating to their reaction temperature substantially the entire amount of the soda ash and sulphur will substantially completely react, maintaining said admixture on the bed of burning residue without substantial mixing with the residue until said admixture has become heated to the reaction temperature of its soda ash and sulphur constituents to form a molten mixture consisting primarily of sodium sulphide and sodium sulphite, and thereafter permitting the molten reaction products to flow onto the burning residue with resulting reduction of the sodium sulphite to sodium sulphide.

4. In the regeneration of sodium hydroxide-sodium sulphide cooking liquors in which a bed of burning carbonized residue from the spent liquor is maintained in a recovery furnace and to which carbonized residue is continuously added, the improvement which comprises continuously charging an admixture of soda ash and sulphur, in which the two constituents are in such contact that on heating to their reaction temperature substantially the entire amounts of the soda ash and sulphur will substantially completely react, onto a portion of the bed of burning residue removed from a point at which said bed is replenished by carbonized residue so as to avoid substantial mixing with the continuously charged residue or the burning residue of the bed until the admixture of soda ash and sulphur has been heated to the reaction temperature of its soda ash and sulphur constituents to form a mixture consisting primarily of sodium sulphide and sodium sulphite, and thereafter permitting the molten reaction products to flow onto the burning residue with resulting reduction of the sodium sulphite to sodium sulphide.

WALTER LEE SAVELL.